United States Patent

Dinzburg et al.

[11] Patent Number: 5,955,035
[45] Date of Patent: *Sep. 21, 1999

[54] METHOD AND APPARATUS FOR DEVULCANIZATION OF CROSS-LINKED ELASTOMERS

[75] Inventors: Boris Dinzburg, Niles; Alexander Berdichevsky, Buffalo Grove, both of Ill.

[73] Assignee: SKF USA Inc., Elgin, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,249

[22] Filed: Mar. 24, 1997

Related U.S. Application Data

[63] Continuation of application No. 08/328,580, Oct. 21, 1994, abandoned, which is a continuation-in-part of application No. 08/214,355, Mar. 16, 1994, abandoned.

[51] Int. Cl.[6] .................................................. B06B 1/00
[52] U.S. Cl. ...................... 422/128; 425/174; 425/174.2; 425/202
[58] Field of Search ............................... 422/128; 264/23, 264/37, 69, 70; 425/174.2, 174, 202

[56] References Cited

U.S. PATENT DOCUMENTS

| | | |
|---|---|---|
| 3,523,147 | 8/1970 | Hold et al. . |
| 3,619,429 | 11/1971 | Torigai et al. . |
| 3,725,314 | 4/1973 | Pelofsky . |
| 3,756,518 | 9/1973 | Bailey . |
| 4,125,578 | 11/1978 | Sear ........................................ 264/29.5 |
| 5,068,068 | 11/1991 | Furusawa et al. . |
| 5,202,066 | 4/1993 | Furusawa et al. . |
| 5,258,413 | 11/1993 | Isayev . |
| 5,284,625 | 2/1994 | Isayev et al. . |

FOREIGN PATENT DOCUMENTS

| | | |
|---|---|---|
| 0173435 | 3/1986 | European Pat. Off. . |
| 1477607 | 4/1967 | France . |
| 134052 | 2/1979 | Germany . |
| 52-12820 | 1/1977 | Japan ........................................ 264/23 |
| 121741 | 6/1987 | Japan . |
| 5-08265 | 1/1993 | Japan . |

OTHER PUBLICATIONS

Reference is a translated abstract only. This is all the information now available to applicant.

*Primary Examiner*—Krisanne Thornton
*Attorney, Agent, or Firm*—Vedder, Price, Kaufman & Kammholz; James T. FitzGibbon

[57] ABSTRACT

A method and apparatus for devulcanizing cured or cross-linked elastomers. The method includes subdividing elastomeric raw material into small particle form, confining the particles of elastomer under high force, as in a screw extruder or the like and, as the particles remain confined, imparting ultrasonic energy to the mass to effect devulcanization. Energy is fed to the confined particles transversely of the axis along which they are advancing, and energy from a source is reflected off a portion of the apparatus and back into the treatment zone so as to achieve maximum energy utilization. In particular instances, reflection of energy is achieved by providing opposed, powered ultrasonic horns that resonate in phase with each other. In another embodiment, oppositely directed, resonantly tuned horns are used, with less than all such horns being powered and the remainder being passive or unpowered reflecting horns who resonant frequency is tuned to that of the powered horn. In one apparatus, the pairs of horns resonate in phase by reason of delay lines interposed between the two power sources. In the other form, the mass of the passive horn is balanced with that of the active horn to achieve in-phase tuning that maximizes reflection of energy.

21 Claims, 3 Drawing Sheets

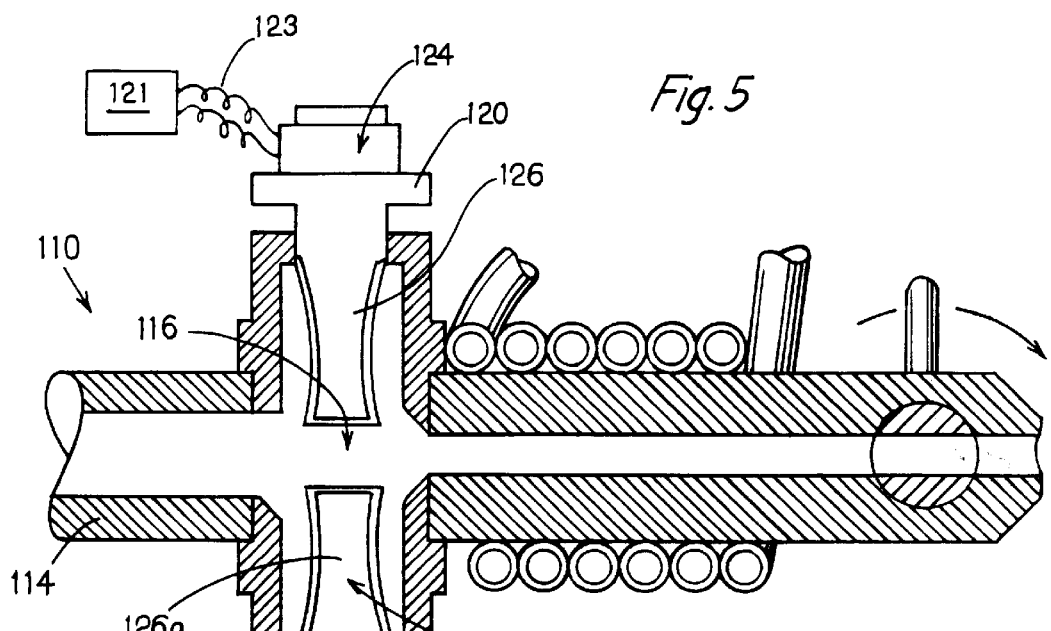
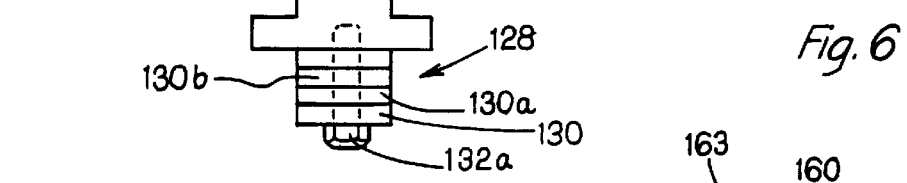
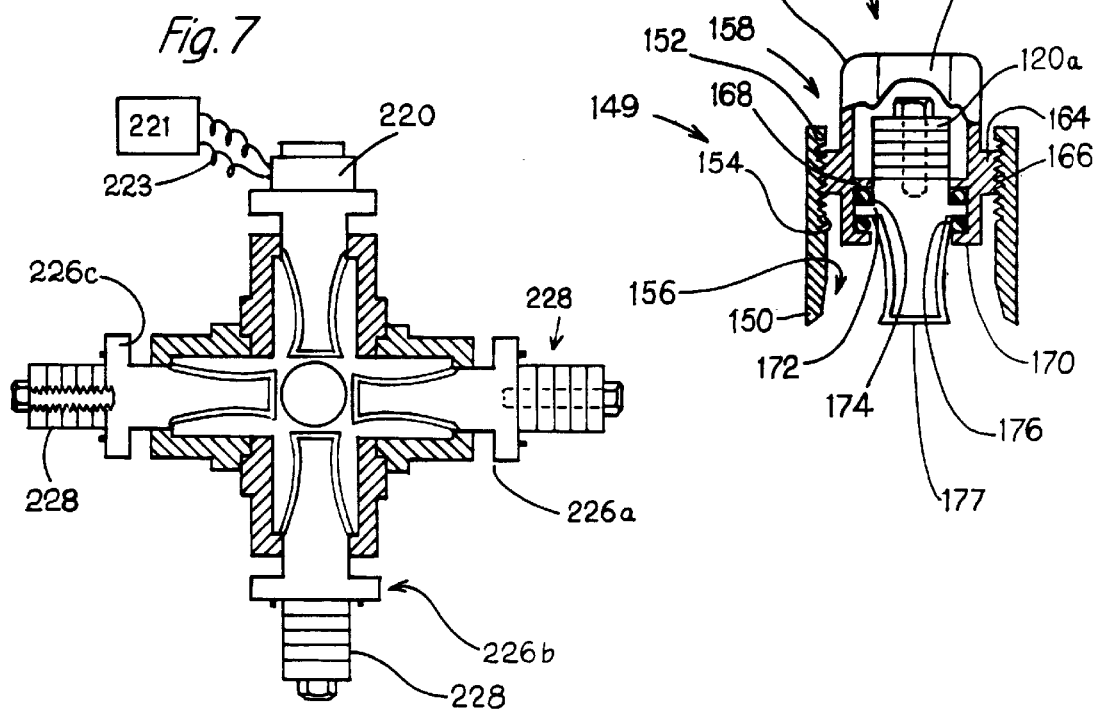

METHOD AND APPARATUS FOR DEVULCANIZATION OF CROSS-LINKED ELASTOMERS

This application is a continuation of application Ser. No. 08/328,580, filed Oct. 21, 1994, now abandoned, which is a continuation-in-part of application Ser. No. 214,355, filed Mar. 16, 1994, now abandoned.

BACKGROUND OF THE INVENTION

The present invention relates generally to industrial processing, and more particularly, to improved apparatus and methods for devulcanizing elastomers or similar cross-linked polymers.

It is readily acknowledged that there is substantial motivation to develop practical methods and apparatus for devulcanizing rubbers, other elastomers, and in some cases, resinous products generally, i.e., polymer products that may be characterized as "cross-linked" or having a three dimensional molecular network.

In particular, rubber is used in million-ton quantities every year in the manufacture of tires, structural products, auto parts and in other applications too numerous to mention. The motivation for recycling rubber products is multi-fold. In one aspect, it is desirable to recycle rubber simply as the way of reducing the amount of waste and potential pollution that results from being unable to reuse the rubber incorporated into vehicle tires and other products.

Another aspect of the same problem is the economic benefit that could be gained by utilizing some or all the components of rubber or other elastomers again and again. In this connection, a great number of products are made from metal, particularly aluminum, that has been used one or more times. Such recycled material is capable of being used repeatedly, whether or not the material being recycled and reused meets the standards of virgin material.

At the present time, in the elastomer field, there are a number of products made from what may be termed "specialty rubbers" and these products, while able to deliver outstanding performance in difficult applications, have historically been characterized by very high cost. Merely by way of example, there are many automotive products, such as seals, diaphragms, gaskets, O-rings, and the like that are called upon to provide service under severe conditions and survive difficult and hostile environments for greatly extended periods, all without failure in use.

However, in the process of resisting high and low temperatures, abrasive stress, chemically threatening solvents and the like, such products have increasingly come to made from exotic elastomers, including, by way of example, polymers that include fluorine or other halogens, nitrogens, and phosphorous. Because of the extreme expense of these materials, there is additional recycling motivation, namely, the potential for greatly decreasing the cost of raw materials used in replacement products. Again, while all materials reclaimed from such a process may not be suitable, at least without modification, for making products which are identical to their counterparts made with virgin stock, the potential for making useful products from reconstituted polymers is still very great. It has been demonstrated that such polymers, when devulcanized by a process such as that comprising the present invention, may be reconstituted by the use of cross-linking or vulcanizing agents and other suitable steps into regenerated or like elastomers having at least some properties that are substantially similar to those of the non-degraded, original elastomer. In particular, materials such as so-called "FKM"s or fluoroelastomers possess the potential ability to be recycled into useful products at significant cost savings.

The potential of recycling such products has eluded most workers for some time; however, one proposal process for devulcanizing existing elastomers has now been discovered, and has been described in general form and claimed in U.S. Pat. No. 5,258,413 issued Nov. 2, 1993. This process is one that basically involves confining particles of cured elastomer within a particular treatment zone, advancing them along a given axis through the zone under pressure, as by a feed auger, and then and there subjecting them to ultrasonic energy propagated along such axis. It is said that this can rupture the various bonds located where the reactive sites were on the monomer before vulcanization. Also, it is said that it is possible to rupture bonds in the linear or branched (but not cross-linked) polymers. These bonds include the carbon-carbon (C—C) bond, the carbon-sulfur (C—S) bond, and the carbon-oxygen (C—O) bonds known to exist in cured elastomers.

The methods described in the above '413 patent also call for positioning an ultrasonic horn as such that it substantially obstructs the outlet diameter of a die through which the material being processed passes under the force generated by an extruder. In the examples described, the horn end face has a diameter that is significantly larger, i. e., approximately twice the diameter, of the die. The axial spacing between the end face and the die is described as being less than 1 millimeter for a horn diameter of 12.7 millimeters. In this patent, the axial clearance is only about 4% of the horn diameter and less than 10% of the outlet die diameter.

A subsequent patent, U.S. Pat. No. 5,284,625 describes a similar apparatus, differing from that of the '413 patent in that it is said that the horn may be inside the area wherein the rubber is confined but still arranged coaxially with the die outlet. Another arrangement of the ultrasonic horns is described wherein two non-circular horn end faces are arranged in facing relationship to each other or with the faces parallel to the direction of elastomer movement. In such arrangement, however, there is no discussion of any particular type of cooperation between the horns, nor is there a discussion of energy confinement as opposed to attempts to input energy to the mass of material being treated.

The present invention is directed to confining and using energy that would otherwise be lost, and is also concerned with greatly increasing the rate of treatment or "throughput" able to be achieved.

Although it is now recognized that ultrasonic energy may be used in such devulcanization, it has also been determined that prior attempts, including those described in the above-referenced patents, have not been as effective as they might have been. Thus, in the past, the amount of energy actually used to rupture the bonds and devulcanize the elastomers in question has been very small in relation to the overall energy input required for the process. It is difficult to transmit the requisite energy in the ultrasonic wave frequency band unless conditions are ideal, because among other things, the rubber particles are non-uniform and they serve to absorb and/or dampen the incoming wave. In addition, the construction and arrangement of the apparatus used to transmit energy into the mass of rubber has not been fully effective to transmit the necessary energy to the rubber.

Accordingly, an effort has been made to increase the rate and level of energy transfer from the ultrasonic apparatus to what may generally be termed the treatment zone of an ultrasonic devulcanization apparatus. According to the invention, it has been discovered that if an ultrasonic horn is arranged in a particular way, or if two or more ultrasonic horns are arranged in one or more ganged, phased or otherwise cooperating arrays, greatly increased efficiency in the rate of energy transfer may be achieved, with the result that the total energy brought to bear on the devulcanizing process can be greatly increased relative to that available using prior methods. This can greatly speed up the devulcanizing process and make it more effective.

Another aspect of the invention is that, whether or not single or multiple horns are used, the remainder of the apparatus should be constructed so as to be reflective rather than absorptive of the energy transmitted to and through what may be termed the treatment zone.

According to the invention, one method of achieving this result in practice is to provide at least a pair or other phased array or gang of ultrasonic energy generators, and connect them by a triggering or energy source that includes a delay line providing a suitable time delay. According to this practice, by way of example, a pair of opposed ultrasonic generators are positioned in a spaced apart relation from each other, spanning a treatment zone in which devulcanizable rubber particles are confined under pressure. According to the invention, the opposed or otherwise functionally connected horns are able to resonate with each other, greatly improving the energy transfer to the being-treated mass.

Suitable adjustments are made in the delay circuit such that the effect of the rubber in absorbing, damping, and/or delaying propagation of the waves breaking down the bonds is largely or almost entirely overcome. By properly phasing the ultrasonic generators or horns, a reinforcing wave pattern can be created whereby the wave amplitude can be increased. Standing waves may thus be created and used effectively. As will appear, various arrangements of the ultrasonic generator components can be made to achieve this purpose.

Another manner of achieving this result is to arrange a second ultrasonic energy device in a particular arrangement relative to the energy transmitting ultrasonic device, with the second device being constructed, arranged, and "tuned" to as to cause the energy it receives from the first device to be reflected back into the treatment zone.

In still other arrangements, it is possible to provide portions of the treatment zone, usually the "back wall" of the treatment zone, i.e., the part facing the horn, with a construction and arrangement such that this wall reflects rather than absorbs the energy transmitted to it.

Another manner in which the invention is practiced is the construction and arrangement of wave generating and/or reflecting elements in such a way that both compression and shear wave components of the energy are taken advantage of; this is done by analysis and subsequent arrangement of parts so as to confine the maximum amount of energy to the treatment zone.

More specifically, another way in which the invention achieves its objects is to bring the rubber in the reaction chamber into resonance and to confine the resonant energy to the mass of rubber so as to achieve useful work, usually in the form of a shear wave energy component that is actually used to break the molecular bonds.

Still another aspect of the invention is to make an efficient arrangement which utilizes not only a directly powered ultrasonic horn, but also a passive or horn component of an ultrasonic assembly only, without using the ultrasonic wave generator, and providing stackable elements or the like for mass tuning of the second or passive ultrasonic horn and amplifier. The manner in which tuning is achieved is preferably mechanical and involves a variation of the mass and its position relative to the horn. This horn can also be adjustably positioned for tuning purposes, i.e., its energy-propagating surface will be a desired distance, related to the wavelength of the energy, from the opposed horn.

There being significant room for improvement in the field of elastomer devulcanization, therefore it is an object of the present invention to provide an improved apparatus and method for devulcanizing elastomers.

Another object of one apparatus of the invention is to provide an improved apparatus for devulcanizing elastomers, with such apparatus including a treatment zone wherein particles of cured elastomer may be confined under pressure, with such zone having at least one ultrasonic generator disposed on each side thereof, with such generators being linked to each other by a triggering arrangement permitting control of the vibrating energy generated by each generator.

Yet another object of the invention is acceleration of the process and increase of the yield by causing the polymer being treated to flow perpendicular to the ultrasound wave front or direction of its propagation.

Another object of the apparatus of the invention is to provide a cross-linked polymer devulcanizing apparatus which includes one or more pairs of ultrasonic horns, the horns in each pair being linked to each other through a delay line mechanism, thereby permitting energy transfer of increased effectiveness by creating a greatly improved output wave form pattern and better energy transfer to the elastomer being treated.

A further object of the invention is arranging an array of individual ultrasonic generators about a treatment zone for devulcanizable elastomers, with the array being constructed and arranged so that the various individual horns or generators are actuated at a precise time in relation to actuation of the other generators in the system as a whole, to achieve a reinforcing or in-phase effect.

A still further object of the invention is to provide a method of rubber devulcanization which includes subjecting rubber particles to devulcanizing energy in the ultrasonic spectrum and which also includes arranging the individual generators in an array such that the generators will operate in phase with one another according to a predetermined plan, thus maximizing energy transfer to the mass to be treated.

Yet another object of the invention is to increase the reaction chamber volume by removing constraints on the way in which the wave is propagated. This improvement involves, but is not limited to, directing the flow of polymer perpendicular to the wave front.

Another object of one embodiment of the invention is to provide an apparatus for devulcanizing elastomers, which apparatus includes means for advancing particles of elastomer to be devulcanized to a treatment zone, and providing a phased array of ultrasonic generators spanning the treatment zone and constructed and arranged to furnish energy thereto in phase with one another as desired by the operator, with the apparatus further including a reduced temperature output area to reduce or eliminate possible degradation and/or revulcanization.

A further object of the invention is to provide a devulcanizing apparatus which uses a particular construction and arrangement of ultrasonic horns, one powered and the other tuned so as to reflect the energy supplied to the first horn into and through the reaction zone or chamber.

Yet another object of the invention is to provide an apparatus for ultrasonic devulcanization wherein wall thickness and other components of the apparatus are arranged so as to maximize energy confinement and minimize transmission of the compression wave energy supplied to the mass through the walls of the apparatus.

A still further object of the invention is to provide an arrangement whereby the largest possible proportion of compression wave energy is confined to the reaction zone and a portion of such energy is converted into shear wave energy causing molecular level devulcanization of rubber specimens.

Another object of the invention is to provide a rubber devulcanization apparatus wherein account is taken of the effective density of the confined rubber particles so as to "tune" the input energy to the wave transmission and energy absorption characteristics of the rubber mass under treatment.

Yet another object of the invention is to provide an apparatus capable of greatly increased speed of operation relative to known prior art rubber devulcanizers.

Still another object of the invention is to provide an improved apparatus using ultrasonic energy and capable of devulcanizing exotic or unusual elastomers, including fluorocarbon and other specialty elastomers at rates that are very favorable relative to known prior art methods of achieving rubber devulcanization.

The foregoing and other objects and advantages of the invention are achieved in practice by providing an apparatus wherein an elastomer devulcanization treatment zone is provided, and wherein the zone is defined at least in part by one or more ultrasonic generators arranged for improved energy transfer, such as providing two or more generators coupled by delay lines or other means so as to operate as a phased array in use of the apparatus, or as passive energy reflection, or by other structural changes to the treatment zone, so as to maximize energy concentration in the treatment zone.

The invention also achieves its objects by a method that includes synchronizing the output of plural ultrasonic generators producing devulcanizing energy in such a way and along such an axis as to maximize transfer of energy to the devulcanizable mass.

The manner in which the foregoing and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 5 is a vertical sectional view through the center of the treatment zone of a further modified form of the inventive apparatus and showing a pair of ultrasonic horns, one being powered and one being a tunable, passive horn without its own wave generator;

FIG. 6 is a fragmentary enlarged view of a portion of one of the passive or energy reflective ultrasonic horns from the invention and showing the mechanism for adjustably positioning the same; and FIG. 7 is a vertical sectional view through the center of the treatment zone of a further modified form of the inventive apparatus and showing a single powered ultrasonic horn and three energy-reflective ultrasonic horns associated with the powered horn and surrounding the remainder of the treatment zone.

DESCRIPTION OF THE PREFERRED
EMBODIMENTS OF THE INVENTION

While the principles of the invention may be carried into practice using a variety of apparatus, a description of a few preferred forms of apparatus will be given wherein several important elements are arranged in a plurality of preferred relations adapted to achieve optimum results.

Figure 1:
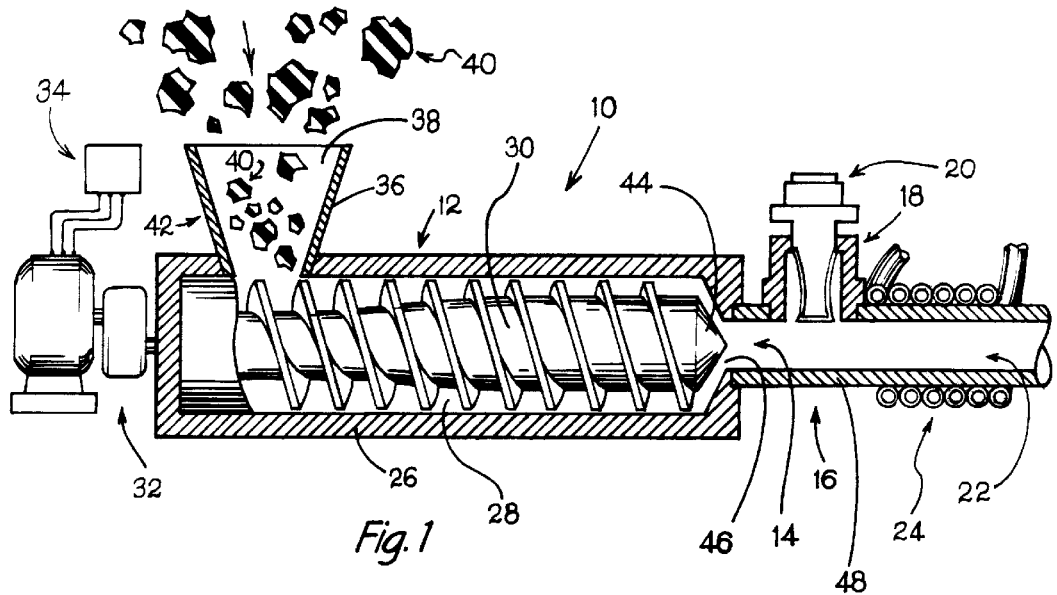
FIG. 1 is a vertical sectional view, partly diagrammatic in character, and showing the basic elements of an apparatus by which the present invention is carried out, with such apparatus including an extruder assembly, an ultrasonic reaction or treatment zone, and an outlet area surrounded by a cooling coil.

Thus, and referring now to FIG. 1, there is shown a devulcanization treatment apparatus generally designated 10, shown to include a number of major components or elements. On the left side of the apparatus, as shown in FIG. 1 is a particle feed means in the form of an extruder assembly generally designated 12. To the right, there is shown means in the form of an extruder outlet tube, generally designated 14 for transferring the elastomer to an ultrasonic treatment or reaction zone.

This extruder outlet tube 14 leads toward and communicates with the interior of means in the form of an enclosed working chamber or reaction zone generally designated 16 for ultrasonically treating elastomeric particles. The chamber includes as a part thereof a mounting assembly generally designated 18 for positioning an ultrasonic generator or horn assembly generally designated 20, and actuated by a power supply schematically shown at 21. An outlet extension tube, generally designated 22, serves as the means for directing the devulcanized material to a collection area. Means in the form of a cooling coil generally designated 24 are provided for the purpose of maintaining an acceptably moderate temperature in the zone beyond the treatment zone 16 to prevent revulcanization or other process within the mass of rubber being devulcanized according to the invention. A valve 25 controls back presence in the reaction zone and compensates for the change in viscosity of the material being processed.

Figure 2:
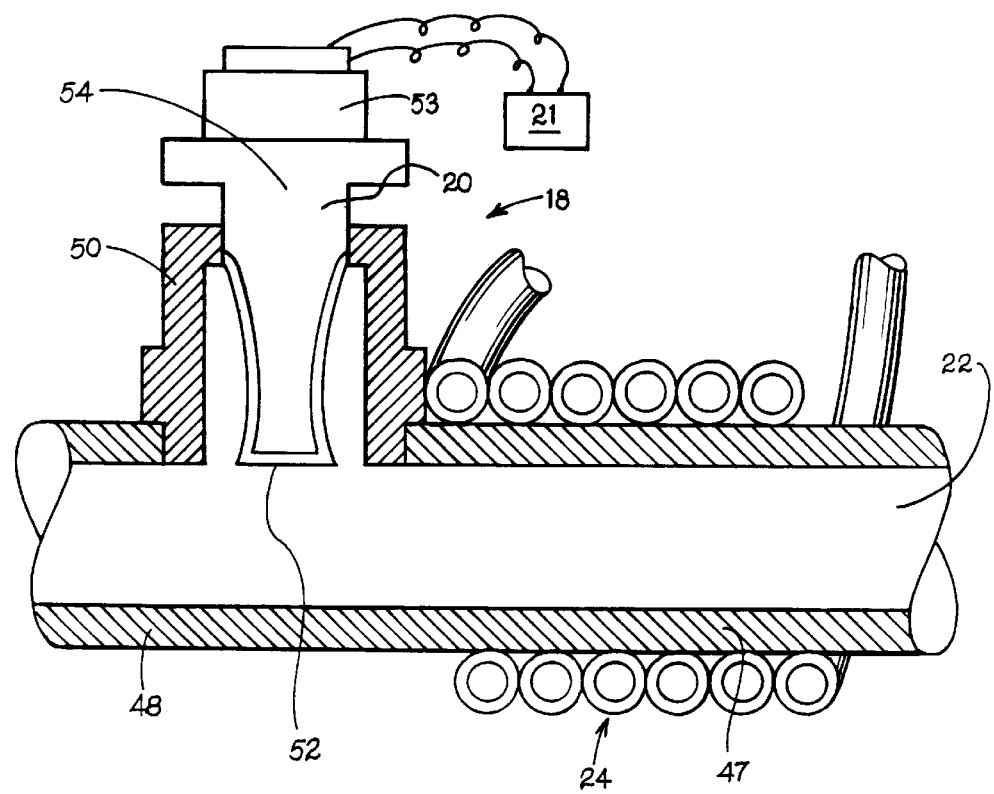
FIG. 2 is a fragmentary enlarged vertical sectional view of a portion of the apparatus of FIG. 1.

FIGS. 1 and 2 show a form of apparatus which is the simplest form of equipment adapted for practice of the invention. As shown in FIG. 1, the extruder unit 12 includes a housing 26 is having an interior central passage 28 in which an auger 30 mounted for rotation. A drive motor and gearbox unit 32, equipped with appropriate controls, schematically shown as 34, are provided to impart controlled rotary movement to the auger. The extruder housing 26 also includes sidewalls 36 defining an upwardly directed opening 38 for receiving particulate rubber or other material 40 to be treated and devulcanized in keeping with the invention.

The sidewalls 36 and the housing 26 cooperate to form a feed hopper unit generally designated 42 for the extruder 12.

Adjacent to the tapered nose portion 44 of the auger 30 is an interior passage 46 lying inside the heavy walled feed tube 48 forming the extruder outlet 14 or transfer passage of the apparatus.

The ultrasonic device mounting 18 (FIG. 2) is defined in part by sidewalls 50 that serve as a housing for the working faces 52 of the ultrasonic horn 20. An appropriate oscillator 53 and its power supply 21 are provided to supply energy to the remote end 54 of the ultrasonic horn or generator 20.

Referring now to the outlet extension 22 of the devulcanizing apparatus 10, this is comprised of an elongated section of reduced diameter tubing 47 positioned coaxially with the feed tube 48, but lying on the outlet end of the treatment zone 18. In the preferred form, this extension 22 is made from metal having a substantial wall thickness, such as from 0.25" up to an inch or more. As shown, a cooling coil 24, also made from a metal material and capable of recirculating chilled water or the like, for example, is secured in intimate heat exchange relation with the outlet extension 22. As will be understood, considerable mechanical energy is used in operating the extruder and forcing the particulate materials to and through the treatment zone; therefore, some cooling means is advisable as a means of maintaining temperature control, especially to prevent overheating and possible degradation and/or revulcanization.

By way of example, a valve generally designated 25 is positioned in the end portion 23 of the outlet extension 22, with the valve including a spool body 29, a center passage 31 and an operating handle 33. Naturally, the valve operation can be automated so as to operate in response to pressure or temperature, or to follow a given instruction set regarding these or other parameters.

Referring now to the operation of the devulcanizing apparatus of the type shown in FIGS. 1 and 2, raw material generally designated 55 is prepared by selecting a cured rubber material, preferably process scrap or the like of a single, given blend, i.e., a material used to make a particular product. By way of example, such a raw material could be fluoroelastomer ("FKM") scrap resulting from the process of making molded oil seals. The rubber to be treated includes process scrap and/or that from unfinished or low quality material such as, for example, molded rubber that failed to adhere to a casing because no cement was applied thereto, cured rubber remaining in the sprues or runners of an injection mold die set, or "flash" or other surplus produced as scrap in a compression or transfer molding process.

Cured rubber of this kind is then preferably subdivided into small particles by a slicing or cutting operation, and then fed to the extruder. The subdivision may also be accomplished by freezing and milling or grinding the scrap, or by other known methods. The extruder 12 is of the type ordinarily used for plastic injection molding or for feeding curable elastomers in a rubber injection molding apparatus. Such extruders are well-known and need not be described in detail herein for an understanding of the invention by those skilled in the art. Preferably, using a very slight auger-to-sidewall clearance, the auger or screw is rotated at a relatively slow rate, such as 20 rpm. This compresses the particulate rubber material and forces it into the extruder outlet 46.

In this zone, the rubber is still of an elastomeric nature, and as thus is a material which resists compression when free of air spaces and totally confined. Although it can be advanced and masticated because of its elastic properties, considerable force is required to advance the rubber along its intended path. The pressure present at the outlet end of the extruder screw may be several hundred p.s.i. or even as much as 1000 p.s.i. or more, resulting in a significant temperature rise when the flow rate is high.

In this connection, it will be realized that, although cured rubbers are elastomeric and deform and elongate readily, all rubber materials are substantially incompressible when totally confined. Accordingly, when the air space between articles has been substantially eliminated, pressures in an area of confinement under force tend to rise rapidly. Especially because most if not all rubbers are good thermal insulators, temperatures also tend to remain at a high level.

As the auger or screw continues to be rotated by the motor gearbox 32 under control of the unit 34, particulate rubber is forced into the treatment or reaction zone 16. Here, according to the invention, the rubber continues to flow along the axis of the auger and feed tube and toward the outlet extension 22. The horn is actuated and supplies energy at an ultrasonic frequency. This direction of advance is parallel to the horn surface in the treatment zone or work chamber 16, and hence the propagation of the ultrasonic waves is generally perpendicular to the movement direction of the particles.

In the form of apparatus shown in FIGS. 1 and 2, only a single ultrasonic horn 20 is shown. Here, the diameter and length of the outlet tube are arranged generally as illustrated in keeping with the invention. First, by providing a cooling coil or the like, the energy present in the mixture, as reflected by the elevated temperature, will not serve to initiate re-cross-linking or extension of the polymer. The length of the outlet extension or tailpipe 22, and the valve assembly and its setting as used in combination to regulate the pressure in the treatment chamber or reaction zone, thereby controlling another of the variables in the devulcanizing treatment.

Also, in the form shown in FIG. 1, one portion 17 of the wall of the treatment zone 16 lies directly opposite the ultrasonic horn 20, as opposed to being positioned so as to emit energy in facing relation to the axis along which the particulate rubber is being advanced. Prior art attempts have used this less favorable, co-axial propagation arrangement; the present invention involves rubber material flow perpendicular to the direction in which the energy is propagated, as uses various means, including the tube length and valve control referred to above, to control internal pressure.

According to the invention, devulcanization may be achieved by using an ultrasonic frequency, i.e., at least 15 KHz, and preferably in a range of 15 KHz–50 KHz. Frequencies outside such range can also be useful. The amplitude of the wave, measured at the horn surface, can be from about 5 or 10 microns up to 200 microns, more or less. The exact amplitude and frequency will be determined in part by experimentation but initially determined also by reference to the pressure within the treatment zone, temperature and the type of material. In those areas wherein some inherent damping may be provided by filler or the like, an appropriate frequency adjustment to the oscillator-driver 53 may be made by turning it and/or the power supply 21.

Figure 3:
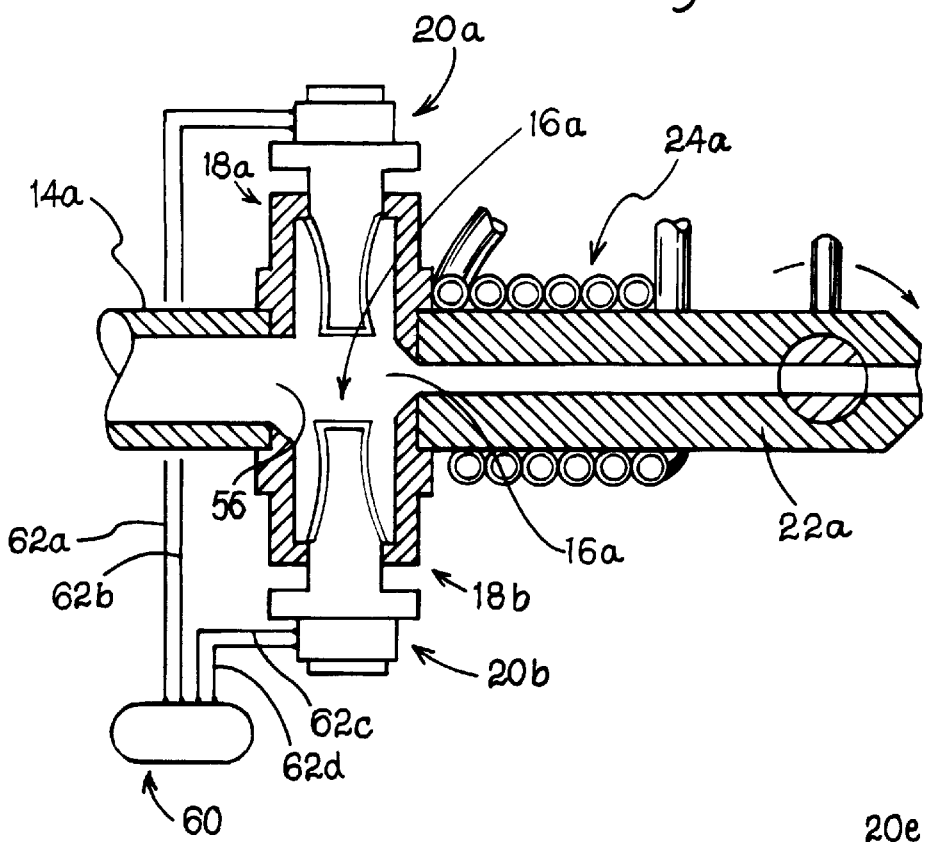
FIG. 3 is a view of an apparatus similar to that of FIG. 1, except that a phased pair of ultrasonic horns is provided, one on either side of a treatment zone.

Referring now to FIG. 3, another and further improved embodiment of a treatment apparatus generally designated 10a is shown for utilizing ultrasonic energy to devulcanize elastomers. In the embodiment shown in FIG. 3, which is one of the presently preferred forms of practicing the invention, most of the major parts of the apparatus are the same as their counterparts in FIG. 1.

Thus, the construction and operation of the extruder assembly, the extruder outlet tube 14a, the outlet extension 22a, and the cooling coils 24a are virtually the same as their counterparts. Likewise, the extruder drive motor and drive motor controls (not shown in FIG. 3) are the same or similar to their counterparts in FIG. 1. However, in the area of the working chamber 16a, there are significant differences. Here, instead of a single ultrasonic horn assembly such as that shown in 20 in FIG. 1, there are a pair of ultrasonic horn assemblies 20a, 20b disposed on opposite sides of the central passage 56 forming a part of the treatment zone 16a.

According to the invention, the upper and lower horn mounting assemblies generally designated 18a, 18b are substantially identical to each other and form a matched pair. Accordingly, it is not believed necessary to an understanding of the invention to describe both in detail.

By arranging the housings 18a, 18b for the horns 20a, 20b in facing relation to each other and straddling the centerline axis of the particle feed passage 56 in the treatment zone 16a, ultrasonic energy generated in one horn is directed toward the opposite horn. Another important feature of the invention, therefore, is the provision of a control arrangement generally designated 60, which provides delay lines 62a, 62b, 62c, 62d, arranged in such a manner that the waves propagated from one ultrasonic horn will be in phase with waves of ultrasonic energy emanating from the counterpart, oppositely directed horn.

Thus, considering the distance by which the horns are spaced apart and the propagation velocity of the waves within the confined material, are a pair of delay lines 62a, 62b, which may be acoustic delay lines or be of another suitable type, serving to delay the onset or triggering of the lower unit relative to the time at which a wave is propagated from the upper unit.

As is well known, and not believed necessary to a full understanding of the invention by those skilled in the art, if two or more ultrasonic horns are able to resonate with each other, the amount of energy transmitted between them can be greatly increased. The degree of damping or cancellation of one wave by another is significantly diminished and instead, a reinforcement or buildup of the wave amplitude takes place by tuning the horns to each other, not only by way of having a constant frequency, but also by way of phase shifting such that the two horns are creating waves that are in phase with one another.

Under ideal conditions, this can create a high energy standing wave in the area between the two horns, and the amplitude of this wave is such that it can achieve significant, greatly increased energy transfer to the particles in the treatment zone. Accordingly, it is possible to utilize ultrasonic energy in this way to treat confined particles of cross linked elastomer to devulcanizing energy, resulting in a much more rapid change of the product passing through the treatment zone from a true cross linked rubber, i.e., a solid of substantial elasticity, to a non-cross-linked polymer or rubber precursor generally. Whether or not the precursor is the same as the original starting materials used to make the elastomer will vary, depending on the circumstances. However, according to the invention, the product obtained can be revulcanized to create useful elastomers with properties similar to those possessed by the elastomer before devulcanization.

While not absolutely necessary to the practice of the invention, a tunable or variable frequency oscillator is preferred for use with each of the ultrasonic generator and horn units in order to achieve devulcanization. Accordingly, the frequency of the ultrasonic waves being emitted from each horn for devulcanization can be varied to suit the nature of the material, its actual bulk density as being processed, etc.

The provision of an appropriate number and arrangement of delay lines is the preferred method of achieving phase shifting, although those skilled in the art recognize that in-phase generation of waves from spaced apart horns or wave sources may also be achieved by the use of other tuning circuits. In other words, the oscillators may be coupled such that their outputs are slightly out of phase with each other, preferably by a time equal to the delay required for the wave to travel from one horn to the other.

The simplest form of apparatus using what may be termed a phase array of ultrasonic horns is shown in FIG. 3, i.e., two horns spaced apart from each other with the treatment zone lying therebetween, and with the components being arranged so that the material being devulcanized moves transversely of the direction of ultrasonic wave propagation.

Figure 4:
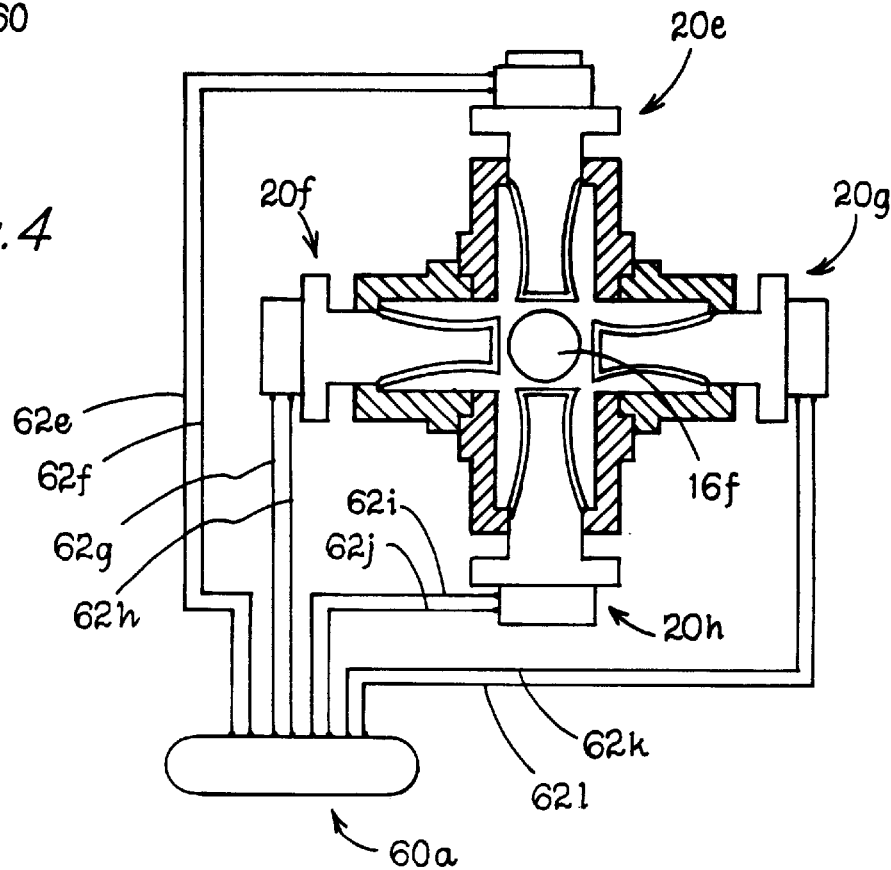
FIG. 4 is a vertical sectional view through the center of the treatment zone of a further modified form of the inventive apparatus and showing a plurality of ultrasonic generator or horns arranged in a phased array and adapted to emit a cooperative, in-phase relationship with one another in transferring energy to the elastomer confined within the treatment zone.

Referring now to FIG. 4, a related but further advantageous arrangement is shown, except that here the phased array comprises four ultrasonic horns, arranged in two oppositely directed pairs. One pair 20e, 20h is spaced apart vertically and the other pair is horizontally spaced apart, with all of the horns having their inner surfaces lying radially outwardly of the common feed axis of the treatment chamber 16f. In this arrangement, a master control means 60a in the form of a regulator for a bank of four sets of delay lines 62e, 62f, 62g, 62h, 62i, 62j; and 62k and 62l is provided for achieving the same purpose. The regulators and delay lines are shown schematically. With this arrangement, it is possible to tune each of the four horns 20e, 20f, 20g, and 20h to have the same frequency and to provide each horn with a pair of delay lines 62e, 62f, 62g, 62h, 62i, 62j, 62k, and 62l, or other phase shifting arrangement. The lines connect each horn with a master control 60a, which insures that the waves from one horn are totally in phase with those from the opposed horn.

It is thus shown to be possible to have vertical and transverse wave sets, for example, intersecting the travel path of the devulcanizable particles, thus subjecting them to in-phase ultrasonic energy from one pair or array that is emitting at either the same or a different frequency than the energy from another pair or array.

Referring now to FIG. 5, there is shown an alternate form of treatment apparatus generally designated 110 and shown to be similar to its counterparts 10 and 10a except in the details to be enumerated. Thus, the apparatus 110 includes an extruder designated 12 in FIG. 1, an outlet tube 114 leading to a reaction zone generally designated 116 and shown to include a powered or "active" ultrasonic generator and horn assembly 120. In this embodiment, the assembly 120 includes a power supply, schematically shown as 121, connected by wires or cables 123 to the electronically actuated transducer or ultrasonic wave generator generally designated 124. This wave generator 124 serves to cause high frequency vibration or oscillation in the associated ultrasonic horn and amplifier 126, which is positioned so as to have a portion extending into the reaction zone 116. The apparatus 110 also includes a second or passive ultrasonic horn unit generally designated 120a positioned in opposed facing relation to the first assembly 120.

The passive ultrasonic unit 120a also includes a horn assembly 126a, but although the unit 120a is operatively associated with the unit 120, it is not independently powered. Instead, the horn assembly 126a includes a stacked array generally designated 128 of individual elements 130, 130a, 130b, etc. each having a characteristic mass. These units 130, 130a, etc. are positioned by a fastener 132a.

The combination of the mass and the configuration of the stacked array 128 of elements 130, 130a, etc. together with their inherent stiffness, imparts a characteristic vibrational frequency to themselves and the horn with which they are associated. In other words, the elements are "tuned" so as to resonate at a particular frequency. As in a tuning fork or the like, the entire horn mass, when excited by a characteristic frequency, will resonate at that frequency and thus transmit energy back to the rubber being treated rather than absorbing and/or dissipating the energy. The remainder of the unit 110 is similar to that of FIGS. 3 and 4, and includes a similar outlet extension tube 122, cooling coils generally designated 124 and valving (not shown) such as that in FIGS. 2 and 3.

Referring now to FIG. 6, another aspect of the invention is shown. Here, a portion of the housing 149 in which the ultrasonic horn is positioned is modified in respect to the construction shown in FIGS. 1–5. In FIG. 6, the horn and amplifier assembly 120a is associated with the stackable elements 128 to form a combination horn amplifier and tuned resonant mass.

In keeping with the invention, and inasmuch as the phenomenon of tuning such that two operatively associated structures resonate with respect to each other, it is necessary to position the two horns a suitable distance from each other. This distance is, namely, a unit of length equal to the length of the compression wave being generated, or at least a low integral multiple of such compression wave length. Of course, in keeping with the considerations discussed herein, such as the density or modulus of the mass, any change of these values causes a change in the speed at which the wave is propagated and its frequency. Accordingly, because it is necessary not only to have a reflective device, but one which is tuned to resonate at the frequency just described or one of its overtones, as just described, it is also necessary to position the passive or reflective horn a desired distance from its associated active or powered horn.

For this purpose, the portion of the horn housing generally designated 149 defined by the housing sidewalls 150 includes an extension or collar 152 in which threads 154 define a portion of an interior bore generally designated 156. This bore 156 is adapted for reception of the combination horn unit and stackable elements 120a comprising the adjustably positionable resonant mass. This assembly 120a also includes a carrier generally designated 158 and shown to include a closed-end upper housing generally designated 160 defined in part by plural, hexagonally arranged outer flank surfaces 162 combining to form a hexagonal head portion 163. The carrier 158 also includes a circumferential exterior rib 164 having exterior threads 166 thereon which mate with the threads 154 on the housing wall 150.

In this arrangement, the carrier 158 also includes upper and lower inwardly extending spaced apart flanges 168, 170. The distance between the positioning flanges 168, 170 is sufficient to accommodate a radially extending rib 172 forming a part of the horn and amplifier assembly 120a. Upper and lower horn positioners in 174, 176 in the form of O-rings are provided to position the horn assembly 120a relative to the carrier 158.

According to the invention, and as shown by the bracket appearing to the left of the structure in FIG. 6, the mounting rib 172 of the horn assembly 120a lies a distance λ from the end face 177 of the horn assembly. Accordingly, vibrationally speaking, the rib 172 lies on a node of the wave. Therefore, securing the amplifier and horn assembly 120a at this point will permit it to be non-rigidly mounted and yet resonate in phase with its associated, powered horn unit.

In use, once the wave length of the standing wave desired to be established by the output of the ultrasonic generator 120 has been determined, the tuned passive or reflector horn and amplifier 120a is positioned such that there is the cooperative, tuned relation discussed herein between the two horn units.

The approximate mathematical relation underlying these attempts are discussed below, but a feature of this embodiment of the invention is that varying either or both of the mass and the position of the passive horn and amplifier can render the apparatus suitable for use with polymers of different composition and/or different density.

Referring now to FIG. 7, a similar apparatus is shown, except that three sets of adjustable, tunable, masses 228 shown to be are provided, each associated with its own ultrasonic horn and amplifier 226a, 226b and 226c. As shown, only one active or powered horn assembly 220 is needed. While these elements are not shown as being adjustable in FIG. 7, it is understood that a mechanism similar to that shown in FIG. 6 or its equivalent can be used for this purpose.

According to the invention, the compression waves created by an ultrasonic generator are propagated equally in all directions throughout the treatment zone. Accordingly, several horns may be tuned to the frequency selected as most effective for devulcanization, and a great amount of energy can be imparted to the mass being treated when all horns are in operation.

Normally, for tuning purposes, once a suitable frequency has been established, the spacing between the horns can be determined by using this frequency to determine the spacing between horns. However, it is also possible to tune the mass such that the space between the horns is a multiple of such distance rather than a length equal to the length of a single wave.

In an embodiment such as those shown in FIG. 4, one horn may emit at a frequency which is a natural overtone of the frequency emitted by the other horn. As long as the delay lines are arranged such that the waves from the respective sources are in phase, there will be points of increased amplitude and nodal points as well, thereby maximizing continuous or periodic energy transfer to the particles sought to be devulcanized. Such an arrangement is a substantial improvement over prior apparatus and methods.

While the value of the invention does not depend on any particular theory of operation, it is thought likely that certain mechanisms may underlie its operation. Thus, in the reaction zone, the rubber is delivered in the form of a pulp which consists of small rubber particles of varying sizes. Under pressure, as supplied by the auger or like confining and feed mechanism, this pulp becomes somewhat homogeneous and will begin to behave as a visco-elastic medium. Mechanical energy in the form of sound waves introduced into this medium are customarily converted into two different modes of oscillation.

The first one is the pressure or compression wave and the second one is the shear wave. The speed and the wave length of these waves depends on the respective compression and shear moduli of the pulp. The compression and the shear moduli of the pulp, when it is confined under strong compressive forces, are of the same order as those of the bulk rubber. Therefore, the value for the compression modulus of the pulp must have an order of magnitude of about 250,000 psi, and the value for the shear modulus of the pulp must be of the order of about 2,500 psi.

Because ultrasonic energy consists of sound waves, the speed of sound and hence the propagation rate can be computed from the formula:

$$V = \sqrt{\frac{E}{\rho}}$$

where V is the speed of sound, E is the elastic modulus (compression or shear respectively), and $\rho$ is the rubber pulp density.

The rubber pulp density is at least somewhat lower than the density of the bulk rubber and, therefore, is about 1.2 gram/cm$^3$ for tire-related compounds. Using the foregoing equation, the value for the speed of the compression wave is of the order of about 1000 m/sec and for the shear wave about 100 m/sec. Slightly lower velocities will apply to fluoroelastomeric compounds, since their density is about 1.95 gram/cm$^3$. The corresponding wave lengths can be immediately determined from the formula:

$$\lambda = V/\omega$$

where $\lambda$ is the wave length in meters and $\omega$ is the oscillation frequency. Taking 40,000 Hz as a typical frequency of the commercially available ultrasonic generators yields the following values of the wave lengths: $\lambda_{compression}$=25 mm, and $\lambda_{shear}$=2.5 mm. At 20 Hz, the wave lengths would be twice as large, i.e., 50 mm and 5 mm, respectively.

From the foregoing considerations, it can be realized that, using ultrasonic equipment of the type just described, the cross-section of the reaction zone, i.e., the area between horns facing each other or facing an opposed surface, can be enlarged from sizes of 1 mm or less up to 25 to 50 mm, merely by way of example. This represents an important improvement over prior art apparatus which fails to use ultrasonic energy in the most effective way.

In any event, alternative constructions that do not provide for either a reflective horn that resonates with another, preferably opposed horn, or greatly increase stiffness opposite the transmitting horn, cannot achieve significant efficiencies in use. Such efficiencies are the keystone to cost savings, especially when the processing rate is considered.

The types of rubbers that can be devulcanized included polar or non-polar rubbers. Without being limited to any enumerated list, some representative types of polar rubbers include chloroprene and nitrile rubbers. Again, without being limited to any enumerated list, some representative non-polar rubbers include styrene-butadiene rubbers (SBR), natural rubber, ethylene-propylene rubbers, butadiene rubbers, isoprene rubbers, butyl rubbers, silicone rubbers and fluorocarbon rubbers.

Inasmuch as one principal purpose of the present invention is to provide methods of economically recovering high priced specialty elastomers, as opposed to attempted economic recovery of lower cost, mass production elastomers of the types used in tires and other comparatively inexpensive rubber products, it was desired to demonstrate the ability to cure the products produced by devulcanization. In other words, the value of the invention would be significantly increased if it were demonstrated that the devulcanized products could be reused, either as a substitute for new rubber products or used in combination with other products to make a new finished product. There are many rubbers which, even if not possessing all the properties, or the full extent of the properties, possessed by the original materials would still have significant commercial value.

Accordingly, as an example, a specimen of a cured fluoroelastomer compound was taken from an existing fluoroelastomer product. This elastomer was grounded up and devulcanized generally in accordance with the method described above.

The devulcanized material resulting from the foregoing process was subsequently incorporated into a rubber compound intended to be used in making a crankshaft seal. This rubber material is cured with a bisphenol cure system of the type well known to those skilled in the art of fluoroelastomer compounding and curing. In this example, the amount of fluorocarbon polymer otherwise customarily used was decreased by one-third, and the missing one-third was replaced with an equal amount of devulcanized rubber resulting from the above example. This compound as a whole was mixed on a 16" laboratory mixing mill and a shape formed therefrom was cured in a mold positioned in a hydraulic press. Cure was carried out to a 90% cure end point, using a temperature of 177° C., ±2° C. until such 90% cure state was achieved. The product thus produced was then post-cured in an oven at 205° C. for ten hours. This is a customary curing and post-curing cycle when using fluoroelastomers adapted to make products for use in the automotive industry, such products including but not being limited to crankshaft seals, valve stem seals, etc.

Testing on the new rubber created by replacing one-third of the original polymer with the novel product produced according to the example herein described did not reduce the "processability" of the compound as a whole, i.e., the raw material, after blending and milling, and during molding, possessed approximately corresponding properties of flowability, curing, etc. and was not overly subject to erratic viscosity properties, unduly rapid scorching or the like. The elongation, tensile strength, and modulus of elasticity were approximately comparable to an elastomer specimen prepared using all "new" materials.

Accordingly, from the foregoing example, it was concluded that useful products could be made by substituting at least some of the devulcanized material for original unvulcanized or virgin material in a similar formulation, and the possibility of obtaining similar overall results was demonstrated. This is not to state, however, that truly identical products were made, or that the devulcanized raw material products of the present invention could be freely substituted for virgin raw materials.

Certain industries, particularly automotive and aircraft industries, have exceptionally high standards and require life cycle and other long-term testing, as well as short-term testing to secure acceptance. Such tests and comparisons were not made here. However, the test results were considered more than adequate to show the ability of the new material to make a product that would function effectively and usefully in a commercial environment. The foregoing are both in keeping with a major object of the present invention, i.e., to reduce the net cost of elastomers, especially where high priced or "exotic" materials are used in the production in question.

Further in accordance with the invention, specimen rubber samples were made using all reclaimed or newly devulcanized rubber which was milled and subsequently cured into a finished product using the bisphenol cure system. This demonstrated that a useful polymer having valuable properties of tensile strength, modulus of elasticity, etc. may be made using only devulcanized fluoroelastomers as the source material. It is reasonably anticipated that other devulcanized elastomers may be similarly used in reconstituting useful elastomers.

While the initial focus of the discussion has been directed to the continuous devulcanization of rubbers, the invention is not necessarily limited to such products. It is within the scope of this invention to apply ultrasonic waves to the three dimensional, cross-linked polymeric networks in thermosets in an attempt to break them. Without being limited to the enumerated examples, a few representative systems suggested for bond-breaking would include polyurethanes, epoxy/phenolic resins, epoxy resins, saturated and cross-linked polyester resins, unsaturated cross-linked polyester resins, phenol/formaldehyde resins, etc.

Regarding the other treatment parameters, the confining force generated by the auger serving to advance the confined particles can vary anywhere from about ten psig to about 10,000 psig. Pressures of about 100 to 500 psig are preferred for some applications. The rotary speed of the screw auger is preferably ranges from about one r.p.m. up to 25 r.p.m. or somewhat more, depending primarily on the auger-to-sidewall clearance, particle size, rotational speed and length of the auger and the tube to the treatment zone.

While some heat may be added to the confining and advancing process, sufficient cooling is provided through use of the cooling coils 24 to ensure that the output temperature of the devulcanized mass is less than 175° C. and preferably in the range of 100–140° C. It is understood that if the temperature in and downstream of the treatment zone becomes too high, there is a distinct possibility that the materials in question will degrade and/or revulcanize by themselves. In this connection, elevated temperatures and pressures normally favor the curing reaction of cross-linkable products, including elastomers generally. Manipulating the valve 25 assists in process control.

The selected ultrasonic frequencies and amplitudes may vary within a significant range. Frequencies and amplitudes varying respectively between 20–50 KHz and 20 –150 $\mu$m are suitable for practice of the invention, and other frequencies and amplitudes can also be useful. In view of the nature of the improved action obtained by phasing the array of ultrasonic generators, the nature of the actual reaction within the treatment zone may be difficult to analyze or predict with accuracy. However, as expressed above, the materials themselves may, to a certain extent, act as dampers for the waves being propagated. As pointed out, a correction for this aspect of the treatment may be made by seeking the correct length of delay or taking other measures to ensure that there is a reinforcing or in-phase resonance of the ultrasonic waves within the treatment zone, regardless of the exact phase of the waves relative to each other when they are triggered or generated by the oscillator or other suitable mechanism.

In some cases, very high energy levels are involved in the devulcanization process. Accordingly, as in rubber processing generally, gases are generated which should be continually removed to insure that the de-vulcanization reactions take place as desired, and that generated gases are not resorbed in the end product or in intermediate stage reaction products.

As is known, vacuum de-gassing equipment may be used to exhaust gases from the reaction zone or other sections of the apparatus. Control of heat load/temperature can also be achieved by controlling the parameters of material flow rate, coolant flow rate, energy addition, reaction zone pressure, etc. in a manner known to those skilled in polymer processing.

Various illustrative examples of preferred forms of treatment apparatus and methods having been disclosed by way of example, it is anticipated that variations and modifications to the described forms of apparatus and the methods referred to herein will occur to those skilled in the art and it is anticipated that such variations may be made without departing from the spirit of the invention or the scope of the dependent claims.

What is claimed is:

1. An apparatus for treating cured elastomeric materials by the application thereto of ultrasonic energy so as to devulcanize said cured elastomeric materials, said apparatus comprising, in combination, a feed apparatus for confining particles of said elastomer within an enclosed region and for advancing said particles only along a given axis under a confining pressure, a feed passage extending axially outwardly from said enclosed region, a reaction zone also having a given axis along which said materials are advanced, said reaction zone being defined in part by at least one end face of at least one vibratory element having an end face adapted, when energized, to emit vibratory energy from said end face in an ultrasonic frequency range of from about 15 kHz to about 30 kHz along an axis transverse to said given axis of said reaction zone, said reaction zone being also defined in part by an opposed wall having a stiffness such that it is resistant to absorbing said ultrasonic vibratory energy emitted by said at least one element, whereby when said feed apparatus is actuated, particles are advanced under high force from said enclosed region and into said reaction zone, and whereby, when said vibrating element end face is energized so as to emit said ultrasonic energy, said energy is transferred to said particles and serves to devulcanize said particles.

2. An apparatus as defined in claim 1 which further includes a passage located downstream of said reaction zone, said passage being adapted for post-treatment of said materials following treatment thereof by ultrasonic energy from said vibratory element.

3. An apparatus as defined in claim 1 which further includes a valve at the end of said post-treatment passage, whereby valve manipulation adjusts the effective cross-sectional area of said downstream passage.

4. An apparatus as defined in claim 1 wherein means is provided for applying additional, intentional cooling to said material following treatment in said reaction zone.

5. An apparatus as defined in claim 2 wherein said means defining said passage comprises an elongated tube and wherein said tube has a cooling coil trained therearound so as to provide cooling for the contents of said tube.

6. An apparatus as defined in claim 1 wherein said at least one vibratory element comprises a pair of vibratory elements positioned in opposed facing relation to each other.

7. An apparatus as defined in claim 6 in which each of said vibratory elements is individually connected to an energy source and said elements are operatively connected so that said elements, when energized, will supply energy to said material in a reinforcing, in-phase relation.

8. An apparatus as defined in claim 7 wherein each of said vibratory elements has its own electro-mechanical transducer and wherein said operative connection between elements comprises electrical and delay line connections between said elements.

9. An apparatus as defined in claim 6 wherein one of said vibratory elements of said pair is an active vibratory element having an energy source associated therewith and the other is a passive vibratory element without a power source, said passive element being constructed and arranged so as to resonate in phase with said powered element when said reaction zone is filled with confined particles and said powered element is energized, said passive element thereby receiving energy from said powered element and reflecting at least some of said energy back into said reaction zone.

10. An apparatus as defined in claim 9 wherein said passive vibratory element has a given mass associated therewith, said mass being of a value and configuration such that said passive element is tuned to substantially the exact operational frequency of said powered element by adjustment of said mass and said passive element will vibrate with said operational frequency.

11. An apparatus as defined in claim 10 wherein said mass is a variable mass, and wherein said apparatus further includes means for adjusting the mass associated with said passive vibratory element so as to tune said passive element so that it will resonate at a desired frequency.

12. An apparatus as defined in claim 9 wherein said passive element is positioned within a carrier whose position is adjustably positionable relative to said reaction zone while remaining in facing relation to said active vibrating element.

13. An apparatus for devulcanizing elastomers by the application thereto of ultrasonic energy in the 15 kHz to 30 kHz range, said apparatus comprising, in combination, means for confining particles of said elastomer to an enclosed region and for feeding said particles along a given axis under pressure toward a co-axially arranged reaction zone, said reaction zone being defined in part by walls also having an axis along which said particles are to be advanced for exposure to vibratory energy, and at least two vibratory elements spaced laterally apart from each other and lying respectively on opposite lateral sides of said reaction zone, said vibratory elements being arranged so as when energized in said 15 kHz to 30 kHz range, to emit said ultrasonic energy toward each other and said confined particles of elastomer, and perpendicular to said axis along which said particles are advanced.

14. An apparatus as defined in claim 13 wherein said at least two vibratory elements comprises four vibratory elements, each being arranged perpendicular to said advancement axis, and being arranged in two pairs disposed in facing relation to each other.

15. An apparatus as defined in claim 13 wherein the end faces of said at least two vibratory elements are in opposed facing relation to each other, and wherein said two units are operatively connected to each other by means for causing said elements to emit vibrating energy in an in-phase relation to each other, said energy passing into the elastomer contained within said reaction zone.

16. An apparatus as defined in claim 13 wherein said at least one pair of vibratory elements comprises two pairs of vibratory elements.

17. An apparatus for devulcanizing a plurality of cured elastomeric particles and including a feed means and a reaction zone wherein said particles of said elastomer to be devulcanized are advanced along a given axis and exposed to ultrasonic energy in the 15 kHz to 30 kHz range, the improvement comprising providing, as a source of said 15 kHz to 30 kHz ultrasonic energy, at least one pair of ultrasonic generators, the individual generators in said pair being arranged with their end faces in opposed facing relation to each other, and said two units being operatively connected to each other by means for causing said elements to emit energy in an in-phase relation with each other such that said energy passes into the elastomer contained within said reaction zone perpendicularly to the axis along which said elastomeric particles are being advanced.

18. An apparatus as defined in claim 17, the further improvement comprising providing two pairs of ultrasonic generators.

19. An apparatus for devulcanizing finely subdivided particle of cured elastomer by the application thereto of ultrasonic energy in the 15 kHz to 30 kHz range, said apparatus comprising, in combination, a housing for confining particles of said elastomer to the interior of an enclosed region and for feeding said particles from said region under a confining force along a given axis toward a reaction zone, a reaction zone being defined in part by walls having an extent parallel to which said particles are to be advanced for exposure to vibratory energy, and at least two vibratory elements spaced apart from each other and lying respectively on opposite sides of said reaction zone, at least one of said vibratory elements being an active element directly energized by a power source and at least one vibratory element being a passive element constructed and arranged in a resonantly tuned relation to said directly energized element, whereby said at least one element will pass energy in a range of from about 15 kHz to about 30 kHz into said reaction zone and toward said passive element, and whereby said passive element will resonate with said active element and thereby pass energy back into said particle of elastomer lying within said reaction zone.

20. An apparatus as defined in claim 19 wherein said passive vibratory element includes a plurality of mass-imparting elements associated therewith, and wherein said resonantly tuned relation is achieved by adjusting the mass of said mass-imparting elements.

21. An apparatus as defined in claim 19 wherein said passive vibratory element includes an adjustably positionable carrier arranged adjusting the position of said passive element relative to said active element, whereby the distance between said elements may be made an integral multiple of the wavelength of the energy transmitted by said first element.

* * * * *